United States Patent [19]

Sugerman et al.

[11] 4,192,792

[45] Mar. 11, 1980

[54] ATACTIC POLYPROPYLENE

[75] Inventors: Gerald Sugerman, Allendale, N.J.; Salvatore J. Monte, Staten Island, N.Y.

[73] Assignee: Kenrich Petrochemicals, Inc., Bayonne, N.J.

[21] Appl. No.: 926,268

[22] Filed: Jul. 20, 1978

[51] Int. Cl.² .............................................. C08K 9/00
[52] U.S. Cl. .............................. 260/42.14; 260/42.16; 260/42.46
[58] Field of Search ............... 260/42.14, 42.15, 42.16, 260/42.46

[56] References Cited

U.S. PATENT DOCUMENTS

| 3,336,254 | 8/1967 | White | 260/42.46 |
| 3,455,865 | 7/1969 | Bolt et al. | 260/42.46 |
| 3,483,276 | 12/1969 | Mahlman | 260/42.46 |
| 3,660,134 | 5/1972 | Morris et al. | 106/308 Q |
| 3,697,474 | 10/1972 | Morris et al. | 260/40 R |
| 3,697,475 | 10/1972 | Morris et al. | 260/37 N |
| 4,087,402 | 5/1978 | Monte et al. | 106/288 Q |

Primary Examiner—Lewis T. Jacobs
Attorney, Agent, or Firm—Bert J. Lewen

[57] ABSTRACT

Atactic polypropylene is upgraded to form composites which are workable by conventional thermoplastic shaping techniques by admixing the amorphous polypropylene with a filler which has been treated with an organo titanate chelate. Preferred fillers are the reinforcing fillers such as the silicates and silica. The organo titanate chelates are alpha, omega-alkylene titanates having two non-hydrolyzable groups.

10 Claims, No Drawings

ATACTIC POLYPROPYLENE

BACKGROUND OF THE INVENTION

Atactic polypropylene, a by-product in the production of crystalline polypropylene, has little value because of its poor physical properties and the inability to mold it in conventional thermoplastic molding operations. Attempts to upgrade actatic polypropylene by the addition of fillers have been largely unsuccessful because of incompatibility of the filler and the comparatively poor tensile strength, flex modulus, and impact properties of the filled material. The filled material is also of little use even for the least demanding applications.

The treatment of fillers with the organo-titanate chelates of the instant invention has been described in U.S. Pat. No. 4,087,402, issued May 2, 1978. While this patent recognizes that these chemicals make fillers more compatible with a variety of plastics, among them the alpha-olefins, there is no disclosure that such treatment would improve the properties of atactic polypropylene.

BRIEF SUMMARY OF THE INVENTION

The subject invention concerns the improvement of the physical properties of atactic polypropylene by admixing such material with a filler treated with an alpha, omega-alkylene titanate having two hydrolyzable groups. These compounds may be represented by the formula:

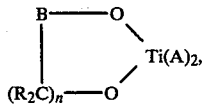

wherein A is a non-hydrolyzable group, B is an $R_2C$ group or a carbonyl group, R is a hydrogen or an alkyl group having 1 to 6 carbon atoms, and n is 1 or 2. Such compounds are described in U.S. Pat. No. 4,087,402. A variety of fillers may be employed, most preferably, the reinforcing fillers, such as the silicates and silica.

DETAILED DESCRIPTION OF THE INVENTION

The physical properties of atactic polypropylene are significantly enhanced by mixing the polypropylene with a filler treated with an organo-titanate chelate. The compositions of the invention have superior physical properties, such as tensile strength, flex modulus and impact resistance, as compared to the atactic polypropylene per se or the atactic polypropylene when blended with untreated filler. The organo-titanate chelates which are useful in the instant invention have the formula:

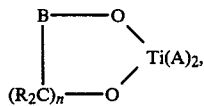

wherein A is a non-hydrolyzable group, B is an $R_2C$ group or a carbonyl group, and R is hydrogen or an alkyl group having from 1 to 6 carbon atoms; and n is 1 or 2. Preferably R is hydrogen. The R's in a particular molecule may be the same or different. The preparation of such compounds is illustrated in U.S. Pat. No. 4,087,402, issued May 2, 1978.

The fillers which may be used may be particulate or a fiber and of a variety of shapes or sizes, so long as the surface is reactive with the hydrolyzable group of the organo-titanate compound. Examples of fillers which may be used include metal fillers (e.g. iron filings), alumina, calcium carbonate and barium sulfate. Most preferred are the reinforcing fillers, i.e., fillers which are capable of increasing the flex modulus of the resin. These include silica and the silicates, e.g., clay, talc, mica, glass and asbestos. As a practical matter, the particle size of the filler should not be greater than 1 mm, preferably from 0.1 micron to 500 micron.

It is imperative that the organo-titanium chelate be properly admixed with the inorganic material to permit the surface of the latter to react sufficiently. The optimum amount to be used is dependent on the effect to be achieved, the available surface area of and the bonded water in the inorganic material.

Reaction is facilitated by admixing under the proper conditions. Optimum results depend on the properties of the organo-titanate, namely, whether it is a liquid or solid, and its decomposition and flash points. The particle size, the geometry of the particles, the specific gravity, the chemical composition, among other things, must be considered. Additionally, the treated inorganic material must be thoroughly admixed with the amorphous polypropylene. Further details on the appropriate mixing equipment and procedures is disclosed in the aforesaid U.S. Patent, the disclosure of which is incorporated herein by reference.

Organo-titanate chelates useful in the instant invention are are those wherein the monovalent non-hydrolyzable group (A) may be acyl, sulfonyl, diester pyrophosphate and diester phosphate.

By non-hydrolyzable is meant a group which will not cleave in a neutral aqueous solution at a temperature less than 100° C. Hydrolysis can be determined by analyzing for liberated acids or alcohols.

The acyl, sulfonyl, diester pyrophosphate and diester phosphate ligand, respectively, are represented by the following formulas: OCOR', —$OSO_2R''$, $(R''O)_2$-P(O)OP(OH)(0)— and $(R''O)_2P(O)0$— wherein R" may be the same as R' as defined below. Where A is a sulfonyl group, it is preferred that R" be phenyl, a substituted phenyl or an aralkyl group having from 5 to 24 carbon atoms in the alkyl chain. Where A is a phosphate group, it is preferred that the R" group have from 6 to 24 carbon atoms, and where A is a pyrophosphate group, it is preferred that the R" group be alkyl having 1 to 12 carbon atoms, preferably 4 to 8.

In the acyl ligand (OCOR'), the R' may be a monovalent organic group having from 1 to about 100 carbon atoms; particularly, an alkyl, alkenyl, aryl, aralkyl or alkaryl group. The aryl groups may be substituted or unsubstituted phenyl or naphthyl groups, preferably containing up to 60 carbon atoms. Additionally, the R' group may be substituted with halo, ether, thioether, cyano, and/or aromatic nitro substituents. Generally up to about six substituents may occur per R' group. The R' group may contain intermediate hetero atoms such as sulfur or nitrogen in the main or pendant substituents. R' is preferably a long chain group having 8 to 18 carbon atoms. Most desirably, all R's are the same.

Examples of specific R' ligands are: methyl, propyl, cyclopropyl, cyclohexyl, tetraethyloctadecyl, 2,4- dichlorobenzyl, 1-(3-bromo-4-nitro-7-acetylnaphthyl)ethyl, 3-thiomethyl-2-ethoxy-1-propyl and metallyl.

Examples of A ligands useful in the practice of this invention include 11-thiopropyl-12-phenyloctadecylsulfonyl, di(2-omega-chlorooctyl)phenyl phosphato, diisonicotinyl pyrophosphato, 1-nitro-3-iodo-4-fluorothiophenoxy, 4-amino-2-brom-7-naphthylsulfonyl, diphenyl pyrophosphato, diethylhexyl pyrphosphato, di-sec-hexylphenyl phosphato, dilauryl phosphato, methylsulfonyl, and 3-methoxynaphthalene sulfinyl.

Examples of the R' groups are numerous. These include straight chain, branched chain and cyclic alkyl groups such as hexyl, heptyl, octyl, decyl, dodecyl, tetradecyl, pentadecyl, hexadecyl, octadecyl, nonadecyl, eicosyl, docosyl, tetracosyl, cyclohexyl, cycloheptyl, and cyclooctyl. Alkenyl groups include hexenyl, octenyl and dodecenyl.

Halo-substituted groups include bromohexyl, chlorooctadecyl, iodotetradecyl and chlorooctahexenyl. One or more halogen atoms may be present, as for example in difluorohexyl or tetrabromooctyl.

In addition to the foregoing aliphatic groups, groups containing hetero-atoms, such as oxygen, sulfur or nitrogen, in the chain may also be used. Examples of these radicals are ethers of the alkoxyalkyl type, including methoxyhexyl and ethoxydecyl. Alkylthioalkyl groups include methylthiododecyl groups.

The aryl groups include the phenyl and naphthyl groups and substituted derivatives. Substituted alkyl derivatives include toluyl, xylyl, pseudocumyl, mesityl, isodurenyl, durenyl, pentamethylphenyl, ethylphenyl, n-propylphenyl, cumyl, 1,3,5-triethylphenyl, styryl, allylphenyl, diphenylmethyl, triphenylmethyl, tetraphenylmethyl, 1,3,5-triphenylphenyl. Nitro- and halosubstituted may be exemplified by chloronitrophenyl, chlorodinitrophenyl, dinitrotoluol, and trinitroxylyl. Halo-substituted aryl groups include fluoro-, chloro-, bromo-, iodophenyl, chlorotoluyl, bromotoluyl, methoxybromophenyl, dimethylaminobromophenyl, trichlorophenyl, bromochlorophenyl and bromoiodophenyl.

Substituted naphthyl groups include nitronaphthyl and chloronaphthyl.

Illustrative of the compounds of the instant invention are:

$OCH_2C(O)OTi[OP(O)(OC_8H_{17})_2]_2$;
$OCH_2C(O)OTi[OP(O)(OC_{12}H_{25})_2]_2$;
$OCH_2C(O)OTi(OCOC_{70}H_{141})_2$;
$OCH_2C(O)OTi[OP(O)(OC_6H_4C_8H_{17})_2]_2$;
$OCH_2C(O)OTi[OCO(CH_2)_6(OSO_2)CH_3]_2$;
$OCH_2C(O)OTi(OCOC_6H_4Cl)\ [OP(O)(OH)OP(O)(OCH_3)_2]$;
$OCH_2C(O)OTi[OC_6H_2(NO_2)_3]$;
$OC_2H_4C(O)OTi(OCOC_{70}H_{141})_2$;
$OC_2H_4C(O)OTi(OCC_{72}H_{141})_2(OCOCH=CH_2)$;
$OC_2H_4C(O)OTi[OCOC(C_{22}H_{43})_3](OCOCHOC_2H_5)$;
$OC_2H_4C(O)OTi[OCOC_6H_4CH_2OCH_2C_6H_3(C_{36}H_{73})_2](OCOC_{70}H_{141})$;
$OC_2H_4C(O)OTi[OCOC(CH_{210}H_7)(C_{22}H_{43})_2][OCOCH(SC_6H_{11})_2]$;
$OC_2H_4C(O)OTi[OCOC(CH_3)=CH_2)_2$;
$OC_2H_4C(O)OTi(OCOCH_2OCH_3)OOCOCHClCH_3)$;
$OC_2H_4C(O)OTi(OCOCCl_3)_2$;
$OC_2H_4C(O)OTi(OCOCHBrCH_2Cl)(OCOC_6H_5)$;
$OC_2H_4C(O)OTi[OCO(CH_2)_{14}CH(CH_3)_2][OCOC(CH_3)=CH_2]$;
$OC_2H_4C(O)OTi[OCO(CH_2)_{14}CH(CH_3)_2]_2$;
$OC_2H_4C(O)OTi[OCO(CH_2)_{16}CH_3]_2$;
$OC_2H_4C(O)OTi[OCO(CH_2)_{16}CH_3]_2$;
$OCH_2CH_2OTi[OP(O)(OC_8H_{17})_2]_2$;
$OCH_2CH(CH_3)OTi[OP(O)(OC_{12}H_{25})_2]_2$;
$OCH_2C(C_2H_5)_2OTi[OP(O)(OC_6H_4C_8H_{17})_2]_2$;
$OC(CH_3)_2C(O)OTi[OC_6H_2(NO_2)_3]_2$;
$OC_2H_4C(O)OTi[OP)O)(OH)OP(O)(OC_8H_{17})_2]_2$;
$OC_2H_4C(O)OTi(OC_6H_4CH_3)_2$;
$OC_2H_4C(O)OTi[OP(O)(OC_6H_5)_2]_2$;
$OC_2H_4C(O)OTi(OSO_2C_6H_4Br)_2$;

The organo-titanium chelates of the invention may be prepared by reacting the esters having the formula $(OR)_2Ti(A)_2$ with an equimolar amount of 2-hydroxypropionic acid or hydroxyacetic acid or their carbon-substituted derivatives. In the case of the oxo derivatives ($B=R_2C$), the titanate ester is reacted with a 1,2- or a 1,3-glycol such as ethylene glycol or 1,3-butanediol.

The amount of filler depends of the particular polymeric material, the filler and the property requirements of the finished product. Broadly, from 10 to 500 parts of filler may be used per 100 parts of polymer, preferably from 20 to 250 parts. The optimum amount may be readily determined by one skilled in the art.

It is particularly surprising that the treated fillers remain extremely active even in the presence of large amounts of free water. For this reason, they may be used with wet process silica, soft or hard clays, talc, aluminum silicate, hydrated alumina and fiberglass. While it is not fully understood why the chelate compounds retain their activity, they are clearly superior to other titanates.

Based on the filler, from 0.01 to about 5 parts per 100 of the titanate should be employed, preferably from 0.05 to 2 parts by weight. The optimum amount varies depending primarily on the surface area of the filler. Greater amounts of the titanate may be used; however, no substantial increase in effectiveness is realized and for economic reasons such additions are undesirable.

The atactic polypropylene may be obtained as a by-product in the preparation of isotactic polypropylene. Depending on the particular system of catalysis used, from about 5 to 15% of atactic material is generally produced in this process. Such material, recovered from a waste stream containing a high amount of the solvent used in the polypropylene polymerization, must initially be dried. Drying is best facilitated by means of a dryer. The solvent should preferably be reduced to less than about 5 wt. %, more preferably below 2%, most preferably below about 0.5%. Preferably, polypropylene drying is facilitated by breaking up the crude atactic polypropylene obtained from the process. After the drying is completed, the atactic polypropylene may be compounded with the treated filler in any conventional high shear mixer or in a conventional extruder. It is generally preferable to treat the filler prior to contact with the atactic polypropylene; however, the organo titanate chelate, the filler and the atactic polypropylene may be admixed at the same time and, so long as the mixing is thorough, good results may be obtained.

In order to illustrate the invention, attention is directed to the following examples:

EXAMPLE 1

In this example, the invention is illustrated by comparing the physical properties of atactic polypropylene per se with talc ($3MgO.SiO_2.H_2O$) filled polypropylene formulations. Of the latter formulations, the first contains untreated talc, while the latter two contain talc treated with 2% (based on weight of filler) of di(dioctylpyrophosphato)ethylene titanate (Titanate I) and di(dioctylphosphato)ethylene titanate (Titanate II). The preparation of the latter titanate is exemplified in Example B of U.S. Pat. No. 4,087,402. The former titanate may be prepared by an analogous procedure, as will be apparent to those skilled in the art.

The following table shows the results obtained. Tensile strength is expressed in lbs/in$^2$, flex modulus in lbs/in$^2$, and impact strength in notched Izod ft. lbs. Test samples are prepared by injection molding the requisite shapes.

Table 1

| Filler | Tensile Strength | Flex Modulus | Impact Strength |
|---|---|---|---|
| None | 1120 | 5300 | 0.6 |
| Talc, untreated | 850 | 70M | 0.2 |
| Talc, Titanate I | 2350 | 95M | 0.5 |
| Talc, Titanate II | 2070 | 87M | 0.4 |

The above data clearly show that the 100% atactic polypropylene would not be satisfactory as a thermoplastic molding compound because of its inadequate tensile and flexural strength. Additionally, the atactic polypropylene containing 40% of the untreated talc would also be ineffective because of low impact strength. On the other hand, the last two samples shown would be satisfactory, since these have outstandingly high tensile strength, flex modulus, and notched Izod impact strength. These properties compare favorably with commercially utilized thermoplastic molding compounds such as 40% Talc filled isotactic polypropylene which has a tensile strength of 3800–4100, a flex modulus of 95–105 M and an impact strength of 0.4.

EXAMPLE 2

Example 1 was repeated, except that atactic polypropylene formulations containing 30% silica were employed. Additionally, a comparative run was made using a mixed isopropyl isostearyl titanate (Titanate TTS) which has an average of 3.19 moles of isostearyl group per molecule. The following table shows the results obtained.

Table II

| Filler | Tensile Strength | Flex Modulus | Impact Strength |
|---|---|---|---|
| Silica, untreated | 1100 | 45M | 0.2 |
| Silica (Titanate I) | 2800 | 110M | 0.5 |
| Silica (Titanate II) | 2400 | 95M | 0.5 |
| Silica (Titanate TTS) | 1700 | 57M | 0.4 |

The foregoing table shows once again that the composition containing the untreated filler has unacceptable physical properties, while the use of silica treated with Titanate I or Titanate II results in an acceptable thermoplastic molding composition. The composition treated with Titanate TTS, a composition not within the scope of the instant invention, while showing some improvement in the physical properties, is substantially inferior to those treated with the organo titanate chelates.

EXAMPLE 3

In this example, a series of runs was performed employing compositions contaning 40% and 60% of calcium carbonate as the filler. The following table shows the results obtained.

Table III

| Filler | Tensile Strength | Flex Modulus | Impact Strength |
|---|---|---|---|
| CaCO$_3$ - 40% Untreated | 1210 | 23M | 0.3 |
| CaCO$_3$ - 40% Titanate TTS | 1450 | 42M | 0.6 |
| CaCO$_3$ - 40% Titanate II | 1370 | 40M | 0.6 |
| CaCO$_3$ - 60% Untreated | 960 | 26M | 0.3 |
| CaCO$_3$ - 60% Titanate TTS | 1600 | 54M | 0.5 |
| CaCO$_3$ - 60% Titanate II | 1550 | 65M | 0.5 |

As will be seen by comparison with the Examples I and II, the compositions containing treated calcium carbonate filler do not have especially good physical properties. On the other hand, this table shows that some improvement is obtained.

What is claimed is:

1. A filled polymeric composition which comprises atactic polypropylene admixed with a comminuted inorganic material reacted with an organic, omega-alkylene titanate having the formula:

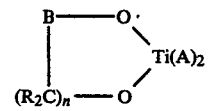

wherein A represents a non-hydrolyzable —OCOR', —OSO$_2$R", (R"O)$_2$P(O)OP(OH)(O)—, or )R"O)$_2$-P(O)O— group; B is an R$_2$C group or a carbonyl group; R is hydrogen or an alkyl group having from 1 to 6 carbon atoms; R' and R" are an alkyl, alkenyl, aryl, aralkyl or alkaryl group, or an alkyl, alkenyl, aryl, aralkyl, alkaryl, halo, ether, thioether, carbonyl or aromatic nitro substituted derivative thereof; and n is 1 or 2.

2. The composition of claim 1 wherein A is —OSO$_2$R" group and R" is phenyl, a substituted phenyl or an aralkyl group having from 5 to 24 carbon atoms in the alkyl chain.

3. The composition of claim 1 wherein A is a (R"O)$_2$-P(O)0— group and R" has from 6 to 24 carbon atoms.

4. The composition of claim 1 wherein A is a (R"O)$_2$-P(O)OP(OH)(O)— group and R" is an alkyl group having up to 12 carbon atoms.

5. The composition of claim 1 wherein A is an —OCOR' group and R' is a long chain group having 11–17 carbon atoms.

6. The composition of claim 1 wherein the comminuted inorganic material is a reinforcing filler.

7. A filled atactic polypropylene composition containing therein a silica or silicate reinforcing filler which has been treated with an organo-titanate compound having the formula:

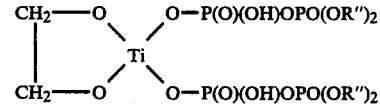

wherein R" is an alkyl group having from 1 to 12 carbon atoms.

8. The composition of claim 7 wherein the alkyl group is octyl.

9. A filled atactic polypropylene composition containing therein a silica or silicate reinforcing filler which has been treated with an organo-titanate compound having the formula:

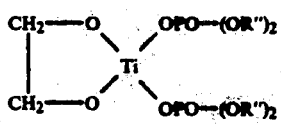
wherein R'' is an alkyl group having from 6 to 24 carbon atoms.
10. The composition of claim 9 wherein the alkyl group is octyl.
* * * * *